March 31, 1970 R. A. COTTON ET AL 3,503,250

FILTER FOR GRAVIMETRIC DETERMINATIONS

Original Filed Jan. 11, 1965

INVENTORS
DONALD R. HAMELIN
RICHARD A. COTTON
BY Pennie, Edmonds
Morton, Taylor & Adams
ATTORNEYS

United States Patent Office 3,503,250
Patented Mar. 31, 1970

3,503,250
FILTER FOR GRAVIMETRIC DETERMINATIONS
Richard A. Cotton, Waban, and Donald R. Hamelin, Georgetown, Mass., assignors to Millipore Corporation, Bedford, Mass., a corporation of Massachusetts
Continuation of application Ser. No. 424,488, Jan. 11, 1965. This application Sept. 23, 1968, Ser. No. 768,599
Int. Cl. B01d 23/02, 25/04; G06n 5/00
U.S. Cl. 73—61                                   6 Claims

ABSTRACT OF THE DISCLOSURE

The gravimetric determination of particulate contaminants in fluids in which a pair of weight matched plastic membrane filters are provided with the parameters effecting changes in tare weight being identical to each other, and the differences in weight of the filters after the fluid has been passed therethrough is measured to find the weight of the contaminants.

---

Figure 1:
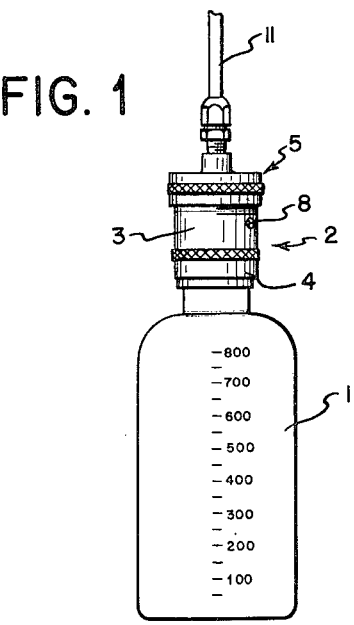

This application is a continuation of application No. 424,488 now abandoned.

This invention relates to the gravimetric determination of particulate contaminants in fluids, particularly in liquids, in which the liquid is filtered and the amount of contamination is determined by weighing the filter and its contaminants. The invention is concerned with the use of sheet filters, and particularly the microporous plastic membrane filters.

It has been the practice heretofore to weigh separately two plastic membrane filters and use them one over the other in a holder such as a filter monitor. It was usually necessary to weigh both filters in the field and to mark the weight on each filter before inserting the filters, one over the other, into a monitor or like filtering device. One of the weighed filters receives the particulate contaminants and both filters absorb the same amount of liquid or non-contaminants so that the contaminants can be determined by the difference in weight of the two filters. This practice is slow and difficult to carry out in the field as the conditions for accurate weighing, and the maintenance of sterile and clean conditions are difficult.

This invention provides an improved filtering technique comprising weight matched pairs of filters of identical structure for use in a filtering device, such as a filter monitor, and an improved filtering process. In accordance with the invention the filters, advantageously microporous plastic membrane filters, are matched in tare weight and are assembled to provide at least one pair of weight matched filters for each gravimetric determination. The weight matched pairs of filters may be assembled as a plurality of weight matched filters arranged to provide in a filter system or monitor a selected pair of weight matched filters. The filters are weighed under ideal conditions as in a laboratory and matched within close limits, preferably with the weights marked on the filters or on an accompanying label. This eliminates the difficult weighing of the filters individually in the field as aforementioned.

In an especially advantageous adaptation of the invention, the weight matched filters are placed one over the other in a holder known as a monitor which secures the filters in position for use and which can be inserted into a device provided with means for passing desired quantities of liquid through the filters in the monitor. The upper filter receives the contaminant and is known as the "test filter" and the other or under filter is known as the "control filter." The preferred plastic filters may advantageously have pores varying from 0.01μ to 8.0μ and are preferably in disc form varying, say, from 10 to 300 mm. in diameter and weighing from 3 mg./cm.$^2$ to 6 mg./cm.$^2$. Such filters may be formed of cellulose esters or nylon and especially efficient filters of this type are manufactured and sold by Millipore Filter Corporation, Bedford, Mass.

The monitor may consist of two interconnected portions which house and secure the filters in position, and the monitor may be formed of metal or plastic. The monitor is important since it provides protection for the filters prior to use and it protects the filters and contaminants after use and provides a safe means to transport the filters to a laboratory for accurate final weighing.

Figure 2:
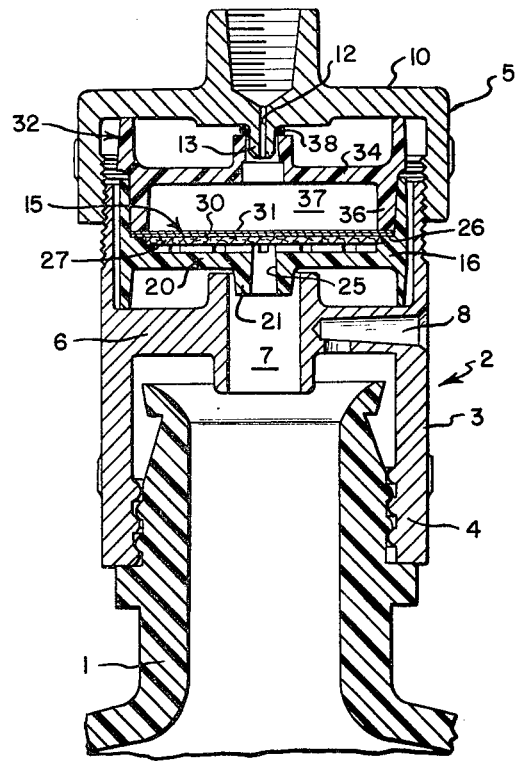

In the accompanying drawings:
FIG. 1 is a side view of one kind of device in which the weight matched filters may be used;
FIG. 2 is an enlarged sectional view of the filter-receiving portion of FIG. 1, and
FIG. 3 is an exploded view, in section, of a monitor as used in the device of FIG. 1, including a pair of weight matched plastic filters.

Figure 3:
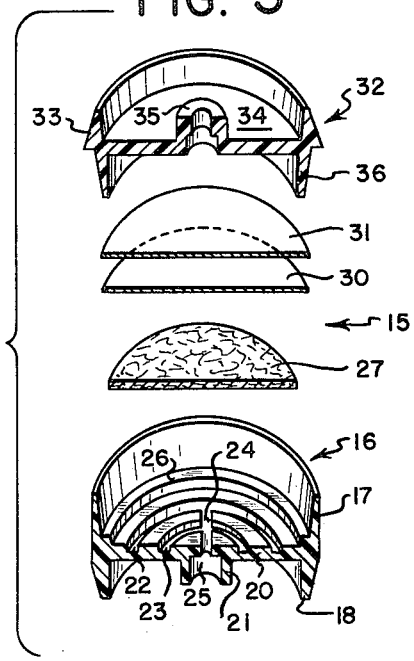

FIGS. 1 and 2 illustrate by way of example a device known as a bomb sampler in which a monitor as shown in FIG. 3 is used.

The sampler illustrated in FIGS. 1 and 2 comprises a measuring flask such as a bottle 1 to which is screw connected a monitor holding housing unit 2 comprising a receptacle 3 having a threaded portion 4 in threaded connection with the bottle 1 and a cap closure 5 in threaded connection with the receptacle 3. The receptacle has a base or partition 6 having a central tubular passageway 7, and a vent opening 8. The cap 5 has a generally flat top 10 threaded to receive the liquid supply pipe 11. The restricted orifice 12 which limits the flow of liquid leads through a depending tube 13.

The monitor 15 shown as separated elements in FIG. 3 and in assembled position in FIG. 2 comprises a dish 16 having a generally cylindrical side wall 17 the lower part of which terminates in a flat edge 18 which bears on the partition 6, and a practically flat filter-base 20 having a depending duct 21 which extends into the passageway 7. The side wall 17 can extend upwardly any suitable distance to form with the base as a receptacle or dish. The base 20 has concentric annular grooves 22 and 23 and at least four radial grooves 24, only one being shown, which are in quadrant positions and which serve to lead filtered liquid to the hole 25 from which it can drop through the duct 21 and into the bottle. As the bottle fills the gas can escape through vent 8. The filter-base 20 has an annular shoulder 26 extending above the grooved surface which is about the thickness of the fibrous filter support 27 for the weight matched plastic filters. The filter support 27 may be filter paper or the like and fits snugly within the annular shoulder 26 as shown in FIG. 2.

The pair of weight matched porous membrane plastic filters 30 and 31 are placed over the support 27 and since they are larger in diameter their edges rest on the shoulder 26 as shown in FIG. 2.

The monitor comprises a cover 32 having an annular wall portion 33 and a transverse partition 34 having an upwardly projecting tube 35 into which the tube 13 projects. The depending part 36 of the side wall is tapered inwardly so that it can be pressed into a leak tight engagement with the inside of the dish 16 as shown in FIG. 2. To prevent leakage or back-flow from the space 37 above the filters an O-ring or other gasket 38 is used. The two parts of the monitor may be made for repeated use of a metal or a plastic which has dimensional stability and is preferably clear so that the filters can be seen, or of an inexpensive plastic, also preferably clear, which can be discarded after a single use.

The foregoing bomb filter device and the monitor are only one of many ways for using the weight matched filters. The filters may be provided in packages from which weight matched pairs can be placed into the monitor as shown. The monitors may also be fully assembled with the filters ready for use. When the measured quantity of liquid has been filtered the monitor can be opened, the filters removed, and the weighing of the filters may be done either in the field or in a laboratory.

In carrying out a process of the invention for determining the contaminants, for example, in petroleum fuel, a measured quantity of fuel is passed through two weight matched filters superimposed one over the other and secured together as in a monitor. The filters may be matched in tare weight to within 0.05 mg. While the contaminants will be retained entirely by the top or "test filter," both filters will be subjected to identical alterations in tare weight as a result of moisture loss or gain, sample adsorption or desorption, or other environmental factors. The total suspended contamination (organic and inorganic) is determined after passage of the liquid sample through both filters, and the filters are given such after treatment as may be necessary such as washing and drying depending on the character of the liquid and contaminants. After the final weighing it is accordingly necessary only to subtract the weights of the two filters. Because both filters weigh the same to start with and both are exposed to the same environments, the difference in final weight between the two is an accurate measure of the amount of contamination in the sample. With this method, detectable contamination levels down to 0.2 mg. per sample can be obtained with a standard deviation of 0.1 mg.

We claim:

1. The improvement in filters for the gravimetric determination of contaminants in liquids which comprises a pair of weight matched plastic membrane filters of identical structure assembled together for use, with the parameters of each of the filters effecting changes in tare weight, including filter material, geometry, initial tare weight, structural dimensions and pore dimensions, being identical so that changes in environmental conditions occurring during said gravimetric determinations subjects the filters to identical alterations in tare weight.

2. The improvement in filters as defined in claim 1 wherein the filter material is microporus cellulose ester or nylon and each of said filters is in disc form having an initial tare weght of between about 3 mg./cm.$^2$ and 6 mg./cm.$^2$, a diameter of between about 10 and 300 mm. and a pore dimension of between about $0.01\mu$ and $8.0\mu$.

3. The improvement in filters as defined in claim 2 in which the pair of filters, one filter being directly over the others, is secured in a monitor which encloses the filters and is provided with means for passing a liquid through the filters.

4. The improvement in filters as defined in claim 2 in which the pair of filters is secured in a plastic monitor consisting of a receptacle and a cover which has a liquid-tight connection with the receptacle, and means for passing of a liquid through the filters.

5. The process for the gravimetric determination of contaminants in a liquid which comprises passing a measured quantity of liquid through a pair of weight matched plastic membrane filters disposed in superposed position and constructed with the physical parameters of each of the filters which effect changes in the tare weight thereof due to any change in enviromental factors occurring during said gravimetric determination, including filter material, geometry, initial tare weight, structural dimensions and pore dimensions, being identical, said liquid being passed in one direction through both of said filters with one of the filters receiving the contaminants; separating and weighing the filters; and subtracting the weight of one filter from the weight of the other to find the weight of the contaminants.

6. The process for the gravimetric determination of contaminants in a liquid which comprises passing a measured quantity of liquid through a pair of weight matched plastic membrane filters disposed in superposed position and constructed with the physical parameters of each of the filters which effect changes in the tare weight thereof due to any cange in environmental factors occurring during said gravimetric determination, including filter material, geometry, initial tare weight, structural dimensions and pore dimensions, being identical, said filter material being microporus cellulose ester or nylon and each of said filters being in disc form having an initial tare weight of between about 3 mg./cm.$^2$ and 6 mg./cm.$^2$, a diameter of between about 10 and 300 mm. and a pore dimension of between about $0.01\mu$ and $8.0\mu$; separating from the liquid on one filter the filterable contaminants; weighing each filter under substantially identical conditions; and computing the weight of the contaminants by subtracting the weights of the two filters.

References Cited

UNITED STATES PATENTS

| | | |
|---|---|---|
| 3,271,999 | 9/1966 | Dwyer et al. _____ 73—61 |
| 3,010,583 | 11/1961 | Kenyon. |

OTHER REFERENCES

Procedure for the Determination of Particulate Contamination in Hydraulic Fluids by the Control Filter Gravimetric Procedure, in Society of Automotive Engineers, Inc., pp. 1–4, Feb. 1, 1963.

LOUIS R. PRINCE, Primary Examiner

J. W. ROSKOS, Assistant Examiner